United States Patent [19]

Hund et al.

[11] 4,285,726
[45] Aug. 25, 1981

[54] ACTIVE ANTI-CORROSION PIGMENTS BASED ON CALCIUM OXIDE, ALUMINIUM OXIDE AND IRON OXIDE

[75] Inventors: Franz Hund; Peter Kresse, both of Krefeld, Fed. Rep. of Germany

[73] Assignee: Bayer Aktiengesellschaft, Leverkusen, Fed. Rep. of Germany

[21] Appl. No.: 168,221

[22] Filed: Jul. 10, 1980

Related U.S. Application Data

[63] Continuation of Ser. No. 21,873, Mar. 19, 1979, abandoned.

[30] Foreign Application Priority Data

Apr. 8, 1978 [DE] Fed. Rep. of Germany ....... 2815306

[51] Int. Cl.$^3$ ............................ C09C 1/00; C09C 1/22
[52] U.S. Cl. ................................. 106/14.05; 106/304; 106/306; 106/14.39
[58] Field of Search ..................... 106/306, 304, 14.39, 106/14.05; 423/594, 600

[56] References Cited

U.S. PATENT DOCUMENTS

| | | | |
|---|---|---|---|
| 3,549,315 | 12/1970 | Lester et al. | 423/594 |
| 4,156,613 | 5/1979 | Hund et al. | 106/306 X |
| 4,225,352 | 9/1980 | Makino et al. | 106/306 X |

FOREIGN PATENT DOCUMENTS 1282307  7/1972  United Kingdom ................. 252/62.62

*Primary Examiner*—Helen M. McCarthy
*Attorney, Agent, or Firm*—Sprung, Felfe, Horn, Lynch & Kramer

[57] ABSTRACT

An anti-corrosion pigment comprising about 30.0 to 2.0 mole % of CaO and about 70.0 to 98.0 mole % of $Me_2O_3$, wherein $Me_2O_3$ is $(1-x)$ $Al_2O_3$ and x $Fe_2O_3$, x is from 0 to 1 and up to about 25 mole % of the $Fe_2O_3$ may be replaced by the corresponding quantity of $Mn_2O_3$, and having a specific surface area according to BET of about 0.1 to 200 $m^2/g$ and a percentage weight loss per gram of pigment, as determined by the Thompson corrosion test, of less than about 0.05% per gram of pigment is produced by calcining the corresponding metal oxides or materials which form the metal oxides on calcination at about 200° to 1100° C. The pigments are especially useful in making up anti-corrosion paints and lacquers.

14 Claims, No Drawings

ACTIVE ANTI-CORROSION PIGMENTS BASED ON CALCIUM OXIDE, ALUMINIUM OXIDE AND IRON OXIDE

This is a continuation of application Ser. No. 021,873, filed Mar. 19, 1979, now abandoned.

Active anti-corrosion pigments, which are of considerable practical importance, are red lead, zinc potassium chromate and zinc dust. By comparison with the substantially inactive iron oxide pigments used in large quantities for corrosion prevention, these active anti-corrosion pigments either have a considerably higher specific gravity or are considerably more expensive. There has been no shortage of attempts to produce active anti-corrosion pigments from inexpensive starting materials of relatively low specific gravity, namely aluminum and iron oxide. Thus, attempts have been made to produce new anti-corrosion pigments based on iron oxide by calcining zinc and alkaline earth metal oxides, hydroxides and carbonates with a variety of different iron compounds (oxide, oxide hydroxide, carbonate, sulphate etc.) at temperatures in the range of from 650° to 1150° C. However, when pigments such as these were tested for their anti-corrosion effect, it was found that, although they give an improvement by comparison with standard iron oxide pigments, they do not approach the active anti-corrosion pigments referred to hereinabove.

An object of the present invention is to develop active and anti-corrosion pigments based on aluminum and iron oxide which are equivalent to known active anticorrosion pigments in regard to their anti-corrosion effect but which do not have any of the disadvantages of known anti-corrosion pigments.

The present invention provides anti-corrosion pigments comprising about 30.0 to 2.0 mole % of CaO and about 70.0 to 98.0 mole % of $Me_2O_3$, where $Me_2O_3$ represents $(1-x)$ $Al_2O_3$ and $x$ $Fe_2O_3$ and $x$ may assume values of from 0 to 1, preferably about 0.01 to 0.95, up to about 25 mole % of the $Fe_2O_3$ being replaceable by the corresponding quantity of $Mn_2O_3$, and having a specific surface area according to BET of about 0.1 to 200 and preferably about 1.0 to 150 $m^2/g$ and a percentage weight loss per gram of pigment, as determined by the Thompson corrosion test, of less than about 0.05% and preferably of less than about 0.03% per gram of pigment.

The present invention also provides a process for producing such anti-corrosion pigments, by calcining the corresponding metal oxides on calcination in the presence of oxygen-containing and/or inert gases at temperatures of about 200° to 900° C., preferably about 300° to 800° C. and, with particular preference, about 400° to 600° C.

The new active anti-corrosion pigments based on calcium oxide, aluminum oxide and iron oxide are produced by preparing intimate mixtures of suitable reactants calcining the mixtures thus prepared at temperatures in a certain range, intensively grinding the calcination product, optionally calcining it once more, followed by cooling and grinding.

The calcination temperature is of importance to the properties of the anti-corrosion pigments formed. In the case of pigments having a low aluminum oxide content, e.g. below about 15 mole %, the calcination temperature is about 200° to 700° C., preferably about 300° to 600° C. and, with particular preference, about 400° C. to 600° C. For pigments of relatively high aluminum oxide content, e.g. above about 15 mole %, the calcination temperatures selected are about 200° to 1100° C., preferably about 250° to 950° C. and, with particular preference, about 300° to 850° C. The calcination time is generally about 0.1 to 20 hours and preferably about 0.5 to 10 hours. The anti-corrosion pigments according to the invention have specific surface areas according to BET (G. Brunnauer, P. H. Emmet and H. Teller, J. Amer. Chem. Soc. 60, 309 (1938)), of from 0.1 to 200 $m^2/g$ and preferably from 1.0 to 150 $m^2/g$.

In the Thompson corrosion test (H. A. Gardener, Physical and Chemical Examinations of Paints, Varnishes, Lacquers and Colors, 11th Edition Bethesda 1950, page 339), the anti-corrosion pigments according to the invention show percentage losses per gram of pigment of less than 0.5% per gram of anti-corrosion pigment and preferably of less than 0.03% per gram of anti-corrosion pigment. By comparison, an anti-corrosion pigment based on $Pb_3O_4$ subjected to the same corrosion test shows a percentage loss per gram of $Pb_3O_4$ of the order of 0.06%, while an active zinc oxide shows a percentage loss per gram of zinc oxide of the order of 0.08% (cf. Table 3).

In the case of CaO, the starting compounds used for the production of the anti-corrosion pigments according to the invention may be the oxide or compounds which form the oxide on calcination, such as hydroxides, hydroxy salts, carbonates, basic carbonates, nitrates, chlorides, formates, acetates, oxalates and other organic compounds of calcium. For $Me_2O_3$, it is possible to use any aluminum and/or iron compounds and, optionally, even manganese oxide compounds or compounds which form aluminum and/or iron and, optionally, manganese oxide on calcination, such as oxide hydroxides, hydroxides, hydroxy salts, carbonates, basic carbonates, nitrates, chlorides, sulphates, formates, acetates, oxalates and organic carboxylates. Where iron or manganese compounds which do not contain or do not exclusively contain the element in its trivalent form are used, the anticorrosion pigment according to the invention has to be calcined in an oxygen-containing atmosphere, preferably in air or in oxygen-enriched air. Among the iron compounds, it has proved to be particularly advantageous to use iron(II)-hydroxide, iron(II)carbonate or basic carbonate which can be obtained by precipitation from iron(II)salts, preferably iron(II)sulphate solution, with alkali metal hydroxide or carbonate.

Other commercially interesting starting materials for iron(III)oxide are the $Fe_3O_4$, $\alpha$-FeOOH and $\alpha$-$Fe_2O_3$ pigment sludges obtained in acid solution in the reduction of aromatic nitro compounds with iron or the iron oxide yellow ($\alpha$-FeOOH), iron oxide orange ($\gamma$-FeOOH) and iron oxide red ($\alpha$-$Fe_2O_3$) pigments which can be obtained by oxidation in air of iron scrap or by the precipitation of $Fe(OH)_2$ in the presence of seeds. The red, brown and black iron oxides obtained from iron(II)sulphate free from or containing water or crystallization by roasting oxidation or roasting reduction processes are also suitable starting compounds for producing the new active anti-corrosion pigments.

In addition to naturally occurring aluminum minerals, such as boehmite and diaspore, and pure aluminum hydroxides stirred out from digestion solutions, suitable aluminum compounds are also mixtures of iron and aluminum compounds, such as the "red sludges" obtained in the digestion of aluminum ores in the aluminum industry and also ores of aluminum oxide containing silicon dioxide or silicates (for example kaolins in the broadest sense).

Starting compounds for manganese are naturally occurring manganese minerals or synthetically produced manganese dioxide and/or the manganese dioxide obtained as a waste product in organic syntheses, which may be used either individually or in combination with the above mentioned iron and aluminum compounds for the production of the anti-corrosion pigments according to the invention.

Another possible method of producing the oxidic starting materials for the new anti-corrosion pigments comprises the complete or partial co-precipitation of calcium, iron(II) or Mn(II)-salt solution and Me(III)-salt solution (Al, Fe, Mn) with alkali or alkaline earth metal hydroxide and/or carbonate solution.

The properties of various anti-corrosion pigments according to the invention in dependence upon the composition and calcination temperature are shown in the tables hereinbelow. The anti-corrosion pigments are produced by preparing intimate mixtures of the reactants and calcining the mixtures thus prepared for 1 hour at a temperature 100° C. below the final temperature indicated in the tables, followed by cooling and grinding. The absolute quantities of the calcined products vary between 50 and 100 g. The results of the pigment tests are shown in Tables 1 and 2.

The Thompson corrosion test on the pigments was carried out as follows:

15 or 30 g of pigment (according to its apparent density), 60 ml of twice-distilled water and four brightly polished razor blades, which had been cleaned and degreased with ether, weighed and tied fast with nylon threads, were introduced into a 200 ml powder bottle provided with a double-bored stopper. The individual powder bottles arranged one behind the other were connected to the various pigment suspensions by glass tubes with empty powder bottles in between. By switching on the laboratory vacuum, a uniform air stream of 60 liters per hour was passed through for 10 days via an air rotameter and an Erlenmeyer flask acting as a bubble counter. Under the effect of this airstream, the pigment suspension is continuously whirled around and the pigment continuously comes into contact with the water. After 10 days, the razor blades were removed from each bottle, carefully cleaned and dried, and the weight loss was determined by reweighing. The percentage weight loss is divided by the quantity of pigment used. The percentage loss per g of pigment is a measure of the degree of corrosion. The lower this value, the greater the corrosion-inhibiting effect of the pigment. Since the values thus determined are very small, they were multiplied by a factor of $10^3$ in order to make comparative assessment easier. These values are indicated in the last columns of Tables 1 to 3.

For comparison with the anti-corrosion pigments according to the invention, Table 3 shows the corrosion behavior of some inorganic pigments in the Thompson corrosion test.

As can be seen, the figures obtained with the inorganic anti-corrosion pigments hitherto used all indicate a loss of more than 0.08% per gram of pigment. The figures obtained with the pigments disclosed in the present application all indicate a loss of less than 0.05% and preferably of less than 0.03% per gram of pigment.

Since, in many cases, the anti-corrosion values determined by the Thompson test represent necessary but, occasionally, inadequate conditions for the practical use of anti-corrosion pigments, one pigment from this series containing 14.3 mole % of CaO and 85.7 mole % of $Al_2O_3$, which had been calcined at a temperature of 500° C. and 600° C., was subjected to the salt spray test according to DIN 53167 or ASTM-B 287-61 in paints applied to steel plates.

The new active anti-corrosion pigments were tested in a long-oil alkyd resin based on tall oil fatty acid of low resinic acid content by comparison with standard commercial-grade zinc phosphate and zinc chromate. A pigment volume concentration (PVC) of 34% was selected for the test. Basic recipe in parts by weight:

167.00 long-oil alkyd resin, 60% in white spirit
2.50 readily volatile oxime as antiskinning agent (Ascinin$^R$ R 55, a product of Bayer AG)
4.00 Co-, Pb-, Mn-octoate, 1:2 in xylene
1.25 Ca-octoate, 4%
25.25 dilution white spirit/turpentine oil 8:2 quantity of pigment according to the pigment volume concentration (PVC) selected.

Grinding is carried out for 5 hours in laboratory vibrating ball mills.

For testing the anti-corrosion behavior of the pigments, the primers are sprayed onto bonderized steel plates (Bonder 125, a product of Metallgesellschaft AG, Frankfurt-on-Main) in such a way that dry layer thicknesses of approximately 45μ are obtained. After a minimum drying time of 7 days, the anti-corrosion test is carried out by the salt spray test according to DIN 53 167 or ASTM B 287-61 (permanent spraying with 5% sodium chloride solution at 35°±2° C.).

The test plates are inspected after 3, 8, 11, 18, 24, 31, 38, 45 and 52 days. They are assessed by a marking system extending from 0 (=no damage) to 12 (=complete destruction of the paint film). This method of assessment is described by P. Kresse in the XIII-FatipecKongressbuch (Cannes 1976), pages 346–353 in "Der Mechanismus der Einwirkung von Salzlösungen auf anstrichbedecktes Eisen (The Action Mechanism of Salt Solutions on Paint-Covered Iron)". The sum of the individual marks on the above-mentioned inspection days up to the 52nd day for the individual pigmenting systems is known as the "degree of corrosion". The greater this sum, i.e. the higher the degree of corrosion in a selected pigment-binder system, the weaker the corrosion-inhibiting effect of the anti-corrosion pigment used.

By comparison with the commercial-grade zinc phosphate anti-corrosion pigment with its relatively poor anti-corrosion values, pigments numbers 2.2 and 2.3 containing 14.3% of CaO and 85.7 mole % of $Al_2O_3$ and calcined at 500° and 600° C. are considerably better (Table 4). Within the errors of the salt spray test, these nontoxic anti-corrosion pigments according to the invention are almost as good in their corrosion-inhibiting effect as the commercially available zinc chromate pigments containing chromium(VI)-ions.

TABLE 1

Corrosion behavior in dependence upon composition and calcination temperature (30 g of pigment/60 ml of $H_2O$; Thompson corrosion test)

| Test No. | Composition in mole % | | | Calcination temperature 1 h - °C. | $10^3$% loss per gram of pigment |
|---|---|---|---|---|---|
| | CaO | $Al_2O_3$ | $Fe_2O_3$ | | |
| 1.1. | 25.0 | 75.0 | — | 400 | 0.0 |
| 1.2. | " | " | — | 500 | 0.0 |
| 1.3. | " | " | — | 600 | 2.0 |

TABLE 1-continued

Corrosion behavior in dependence upon composition and calcination temperature (30 g of pigment/60 ml of H₂O; Thompson corrosion test)

| Test No. | Composition in mole % CaO | Al₂O₃ | Fe₂O₃ | Calcination temperature 1 h - °C. | 10³% loss per gram of pigment |
|---|---|---|---|---|---|
| 1.4. | " | " | — | 700 | 0.0 |
| 1.5. | " | " | — | 800 | 0.0 |
| 1.6. | " | " | — | 900 | 0.0 |
| 1.7. | " | — | 75.0 | 400 | 15.8 |
| 1.8. | " | — | " | 500 | 45.5 |
| 1.9. | " | — | " | 600 | 52.7 |
| 1.10. | " | — | " | 700 | 43.0 |
| 1.11. | " | 75.0 | — | 500 | 0.0 |
| 1.12. | " | 56.2 | 18.8 | 500 | 9.5 |
| 1.13. | " | 37.5 | 37.5 | " | 0.7 |
| 1.14. | " | 18.8 | 56.2 | 500 | 0.0 |
| 1.15. | " | " | " | 600 | 27.4 |
| 1.16. | " | 25.0 | 25.0 + 25.0% Mn₂O₃ | 500 | 11.4 |
| 1.17. | " | " | 25.0 + 25.0% Mn₂O₃ | 600 | 40.6 |

TABLE 2

Corrosion behavior in dependence upon composition and calcination temperature (30 g of pigment/60 ml of water; Thompson corrosion test)

| Test No. | Composition in mole % CaO | Al₂O₃ | Fe₂O₃ | Calcination temperature 1 h - °C. | 10³% loss per gram of pigment |
|---|---|---|---|---|---|
| 2.1. | 14.3 | 85.7 | — | 400 | 0.0 |
| 2.2. | " | " | — | 500* | 0.0 |
| 2.3. | " | " | — | 600* | 0.0 |
| 2.4. | " | 64.3 | 21.4 | 500 | 6.1 |
| 2.5. | " | " | " | 600 | 9.1 |
| 2.6. | " | 42.9 | 42.8 | " | 11.9 |
| 2.7. | " | 21.4 | 64.3 | 500 | 10.2 |
| 2.8. | " | " | " | 600 | 21.2 |
| 2.9. | " | 8.6 | 77.1 | " | 21.8 |
| 2.10. | " | — | 85.7 | " | 19.0 |
| 2.11. | 5.0 | 95.0 | — | 500 | 0.0 |
| 2.12 | " | 71.3 | 23.7 | 400 | 30.6 |
| 2.13 | " | 47.5 | 47.5 | 600 | 33.3 |
| 2.14. | 2.5 | 97.5 | — | 400 | 13.7 |
| 2.15. | 1.0 | 99.0 | — | 600 | 90.5 |
| 2.16. | — | 100.0 | — | " | 232.4 |

*used for the salt spray test

TABLE 3

Corrosion behavior of some inorganic pigments in the Thompson corrosion test

| Test No. | Type of pigment | g of pigment/60 ml of water | Loss (%) | 10³% loss per g of pigment |
|---|---|---|---|---|
| 3.1. | α-FeOOH | 15 | 10.10 | 673.0 |
| 3.2. | α-Fe₂O₃ | 30 | 5.05 | 168.0 |
| 3.3. | Fe₃O₄ | 30 | 10.36 | 345.0 |
| 3.4. | γ-CrOOH | 15 | 1.69 | 113.0 |
| 3.5. | Pb₃O₄ | 30 | 1.73 | 57.7 |
| 3.6. | ZnO | 15 | 1.20 | 80.4 |

TABLE 4

Results of the anti-corrosion test (salt spray test according to DIN 53 167 or ASTM B 287-61; pigment volume concentration = 34%)

| Pigment | Degree of corrosion after 1248 hours under test |
|---|---|
| Pigment No. 2.2. - 500° C. 14.3 mole % CaO; 85.7 mole % Al₂O₃ | 16.0 |
| Pigment No. 2.3. - 600° C. 14.3 mole % CaO; 85.7 mole % Al₂O₃ | 21.5 |
| Zinc phosphate | 48.5 |
| Zinc chromate | 11.5 |

It will be appreciated that the instant specification and examples are set forth by way of illustration and not limitation, and that various modifications and changes may be made without departing from the spirit and scope of the present invention.

What we claim is:

1. An anti-corrosion pigment consisting essentially of about 25.0 to 2.5 mole % of CaO and about 75.0 to 97.5 mole % of Me₂O₃, wherein Me₂O₃ is $(1-x)$ Al₂O₃ and $x$ Fe₂O₃, $x$ is from 0 to 1 and up to about 25 mole % of the Fe₂O₃ may be replaced by the corresponding quantity of Mn₂O₃, and having a specific surface area according to BET of about 0.1 to 200 m²/g and a percentage weight loss per gram of pigment, as determined by the Thompson corrosion test, of less than about 0.05% per gram of pigment.

2. A pigment according to claim 1, having a specific surface area of about 1 to 150 m²/g.

3. A process for the production of an anti-corrosion pigment according to claim 1, comprising calcining the corresponding metal oxides, or materials which form the metal oxides on calcination, at about 200° to 900° C.

4. A process according to claim 3, wherein calcining is effected at about 300° to 900° C.

5. A process according to claim 3, wherein calcining is effected at about 400° to 600° C.

6. A process according to claim 3, wherein a hydroxide, hydroxy salt, carbonate, basic carbonate, nitrate, sulphate, chloride, formate, acetate or oxalate is used as the CaO-component.

7. A process according to claim 3, wherein the starting material for the Al₂O₃ is a natural or synthetic oxide, oxide hydroxide, hydroxide, amorphous hydroxide of aluminum, solid solution of aluminum with iron or silicate-containing compounds of aluminum, or the "red sludge" obtained in the digestion of iron-containing aluminum ores for the production of aluminum metal.

8. A process according to claim 3, wherein the starting material for the Fe₂O₃ is an oxide, hydroxide, hydroxy salt, carbonate, basic carbonate, nitrate, chloride, sulphate, formate, acetate or oxalate of Fe(II), or a Fe(II)-Fe(III)-oxide, calcination being carried out in the presence of an oxygen-containing gas.

9. A process according to claim 3, wherein the starting material for the Fe₂O₃ is an α-, β- or γ-iron(III)-oxide, α-, β-, γ- or δ-iron(III)-oxide hydroxide, amorphous iron(III)-hydroxide, iron(III)-sulphate, nitrate, chloride, formate, acetate or other iron(III)-salt of an organic compound or an iron(II)-iron(III)-oxide.

10. A process according to claim 3, wherein the pigment contains Mn₂O₃ and the starting material therefor is a naturally occurring manganese mineral, synthetically produced manganese dioxide, or manganese dioxide obtained as a waste product in organic synthesis.

11. A process according to claim 3, wherein the starting materials used for Al₂O₃, Fe₂O₃ and Mn₂O₃ when present are mixed hydroxides or oxide hydroxides of Al(III), Fe(III) and Mn(II) or Mn(III).

12. A process according to claim 5, wherein a hydroxide, hydroxy salt, carbonate, basic carbonate, nitrate, sulphate, chloride, formate, acetate or oxalate is used as the CaO-component, the starting material for the $Al_2O_3$ is a natural or synthetic oxide, oxide hydroxide, hydroxide, amorphous hydroxide of aluminum, solid solution of aluminum with iron or silicate-containing compounds, the starting material for the $Fe_2O_3$ is an oxide, hydroxide, hydroxy salt, carbonate, basic carbonate, nitrate, chloride, sulphate, formate, acetate or oxalate of Fe(II), or a Fe(II)-Fe(III)-oxide in which event calcination is carried out in the presence of an oxygen-containing gas, or is an $\alpha$-, $\beta$- or $\gamma$-iron(III)-oxide, $\alpha$-, $\beta$-, $\gamma$- or $\delta$-iron(III)oxide hydroxide, amorphous iron(III)-hydroxide, iron(III)-sulphate, nitrate, chloride, formate, acetate or other iron (III)-salt of an organic compound or an iron(II)-iron(III)-oxide, and the starting material for the $Mn_2O_3$ if present is a naturally occurring manganese mineral, synthetically produced manganese dioxide, or manganese dioxide obtained as a waste product in organic synthesis.

13. A process according to claim 5, wherein a hydroxide, hydroxy salt, carbonate, basic carbonate, nitrate, sulphate, chloride, formate, acetate or oxalate is used as the CaO-component, and the starting materials used for $Al_2O_3$, $Fe_2O_3$ and $Mn_2O_3$ when present are mixed hydroxides or oxide hydroxides of Al(III), Fe(III) and Mn(II) or Mn(III).

14. An anti-corrosion paint or anti-corrosion lacquer pigmented with an anti-corrosion pigment according to claim 1.

* * * * *